(12) United States Patent
Burmester et al.

(10) Patent No.: US 8,596,298 B2
(45) Date of Patent: Dec. 3, 2013

(54) PIPING SYSTEM FOR PROCESS PLANTS IN THE FOOD AND BEVERAGE INDUSTRY

(75) Inventors: Jens Burmester, Grambek (DE); Matthias Suedel, Ratekau (DE)

(73) Assignee: GEA Tuchenhagen GmbH, Buechen (DE)

( * ) Notice: Subject to any disclaimer, the term of this patent is extended or adjusted under 35 U.S.C. 154(b) by 307 days.

(21) Appl. No.: 12/995,067

(22) PCT Filed: May 27, 2009

(86) PCT No.: PCT/EP2009/003771
§ 371 (c)(1),
(2), (4) Date: Jan. 28, 2011

(87) PCT Pub. No.: WO2009/146825
PCT Pub. Date: Dec. 10, 2009

(65) Prior Publication Data
US 2011/0114198 A1   May 19, 2011

(30) Foreign Application Priority Data

May 30, 2008  (DE) .......................... 10 2008 026 149
Jul. 31, 2008  (DE) .......................... 10 2008 035 940
Oct. 15, 2008  (DE) .......................... 10 2008 051 819

(51) Int. Cl.
*F16K 5/10*  (2006.01)
(52) U.S. Cl.
USPC ................ 137/614.17; 137/240; 137/597
(58) Field of Classification Search
USPC ............... 137/237, 238, 240, 263, 312, 597, 137/614.11, 614.17, 614.18
See application file for complete search history.

(56) References Cited

U.S. PATENT DOCUMENTS

| | | | |
|---|---|---|---|
| 4,436,106 A | 3/1984 | Tuchenhagen et al. | |
| 5,232,023 A * | 8/1993 | Zimmerly | 137/637.2 |
| 5,275,201 A * | 1/1994 | Zimmerly | 137/454.6 |
| 5,390,694 A * | 2/1995 | Zimmerly et al. | 137/240 |
| 5,441,079 A * | 8/1995 | Zimmerly | 137/637.2 |
| 6,136,362 A * | 10/2000 | Ashton | 426/521 |
| 6,178,986 B1 * | 1/2001 | Burmester | 137/240 |
| 7,302,958 B2 * | 12/2007 | Worczinski | 137/1 |
| 2008/0257417 A1 * | 10/2008 | Thomaschki | 137/266 |

FOREIGN PATENT DOCUMENTS

| | | |
|---|---|---|
| DE | 900763 | 1/1954 |
| DE | 2229987 | 1/1974 |
| DE | 2847038 | 5/1980 |

(Continued)

OTHER PUBLICATIONS

GEA Tuchenhagen Brewery System, ECO-Matrix, 223d-Oct. 2006.

*Primary Examiner* — John Rivell
*Assistant Examiner* — Reinaldo Sanchez-Medina
(74) *Attorney, Agent, or Firm* — Vidas, Arrett & Steinkraus, P.A.

(57) ABSTRACT

A piping system for food and beverage process plants connecting a tank and process assembly to a pipe system via double seat valves mix-proof in the seat including valve distributor trees and the double seat has two serially disposed closing members with open and closed positions, the closing members delimiting a leakage cavity with a connection path to the surroundings of the double seat valve. A first closing member comes in sealing contact at a second closing member and transfers the second closing member into a sealed position. The second closing member having a hollow rod and a seat seal.

25 Claims, 10 Drawing Sheets

(56) References Cited

FOREIGN PATENT DOCUMENTS

Figure 1:
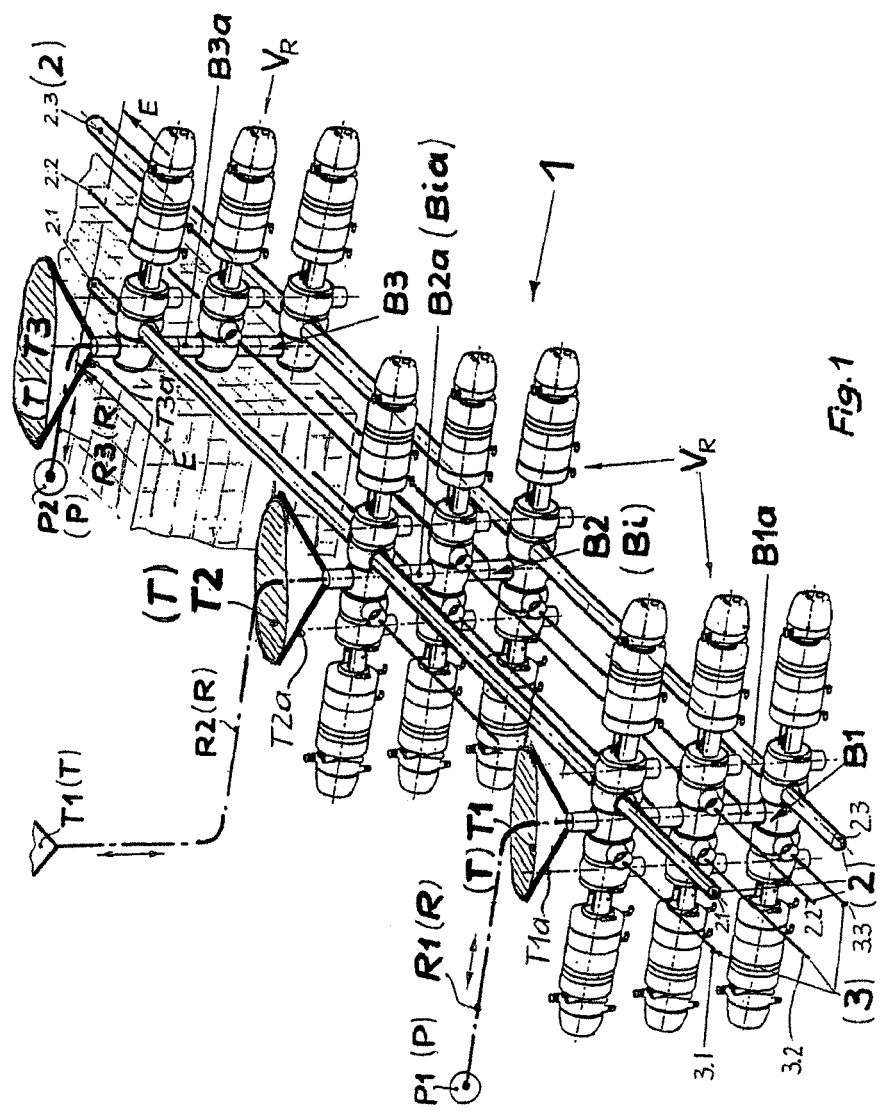

| DE | 2948534 | 7/1981 |
| DE | 3042895 | 5/1982 |
| DE | 29821813 | 2/1999 |
| DE | 10108259 | 1/2002 |
| DE | 10 2005 051467 | 4/2007 |
| DE | 102006059556 | 10/2007 |
| DE | 102007020183 | 9/2008 |
| EP | 0625250 | 11/1994 |
| WO | 93/16307 | 8/1993 |
| WO | 98/54494 | 12/1998 |
| WO | 0125670 | 4/2001 |

\* cited by examiner

A-A

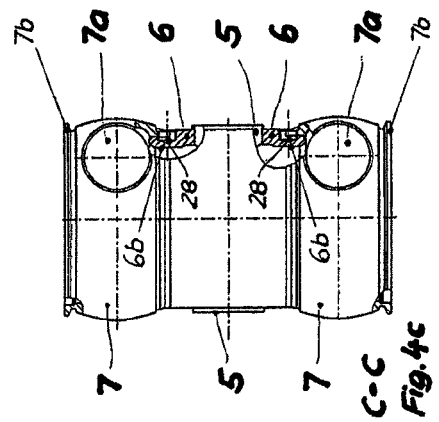
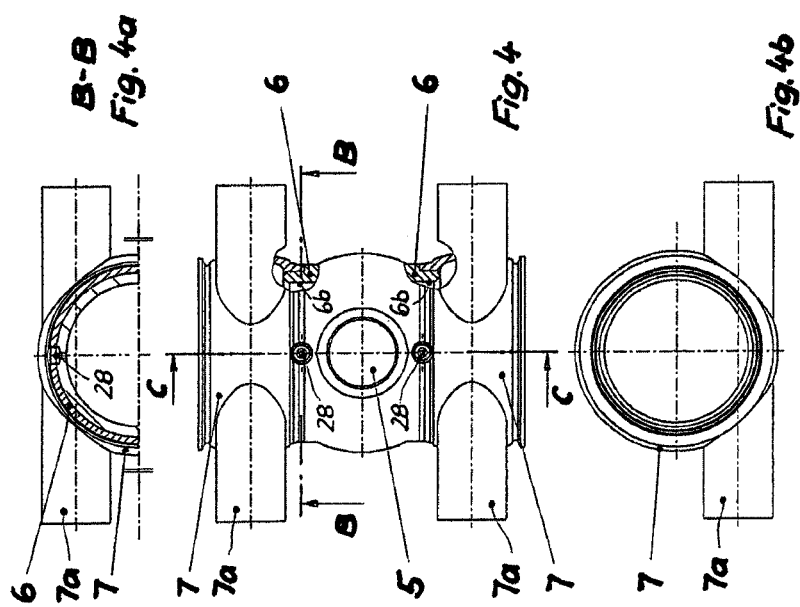

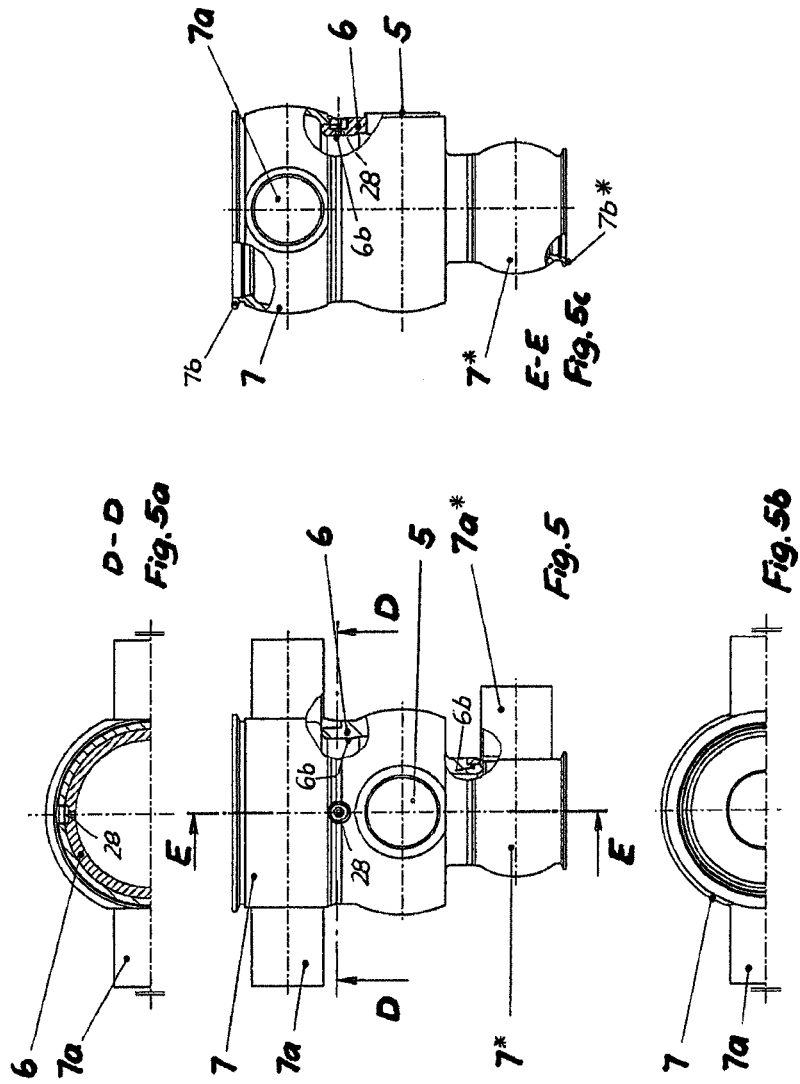

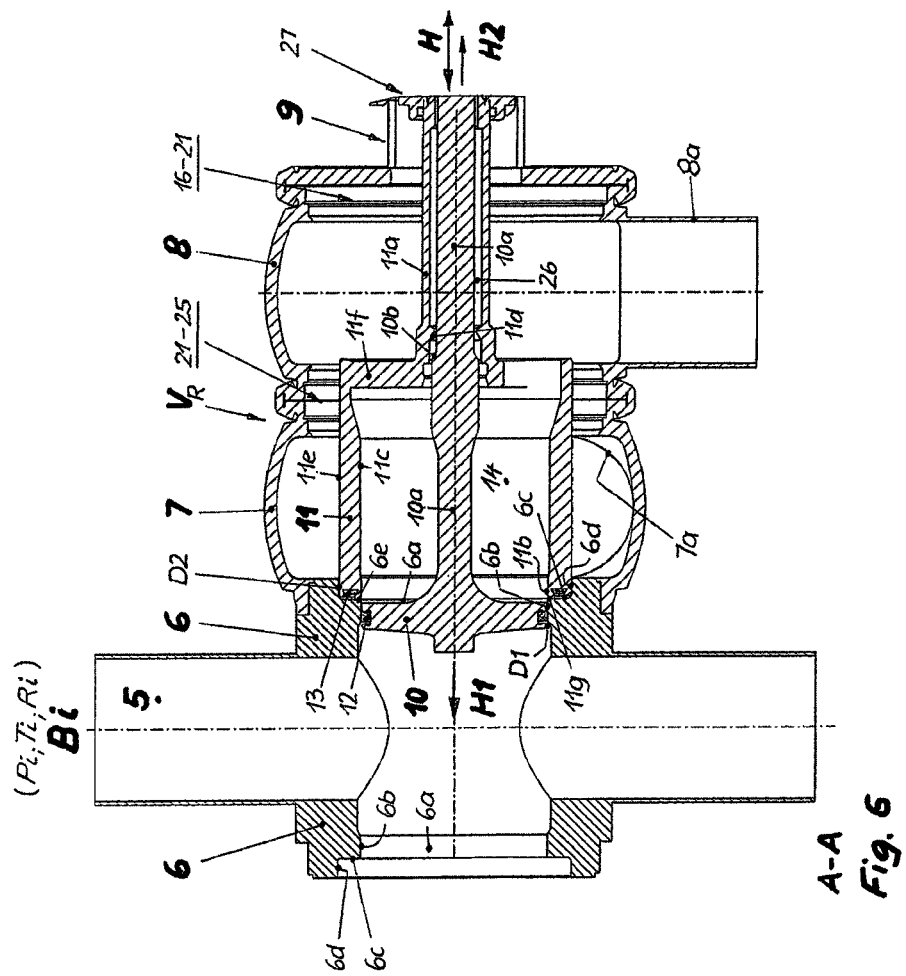

A-A

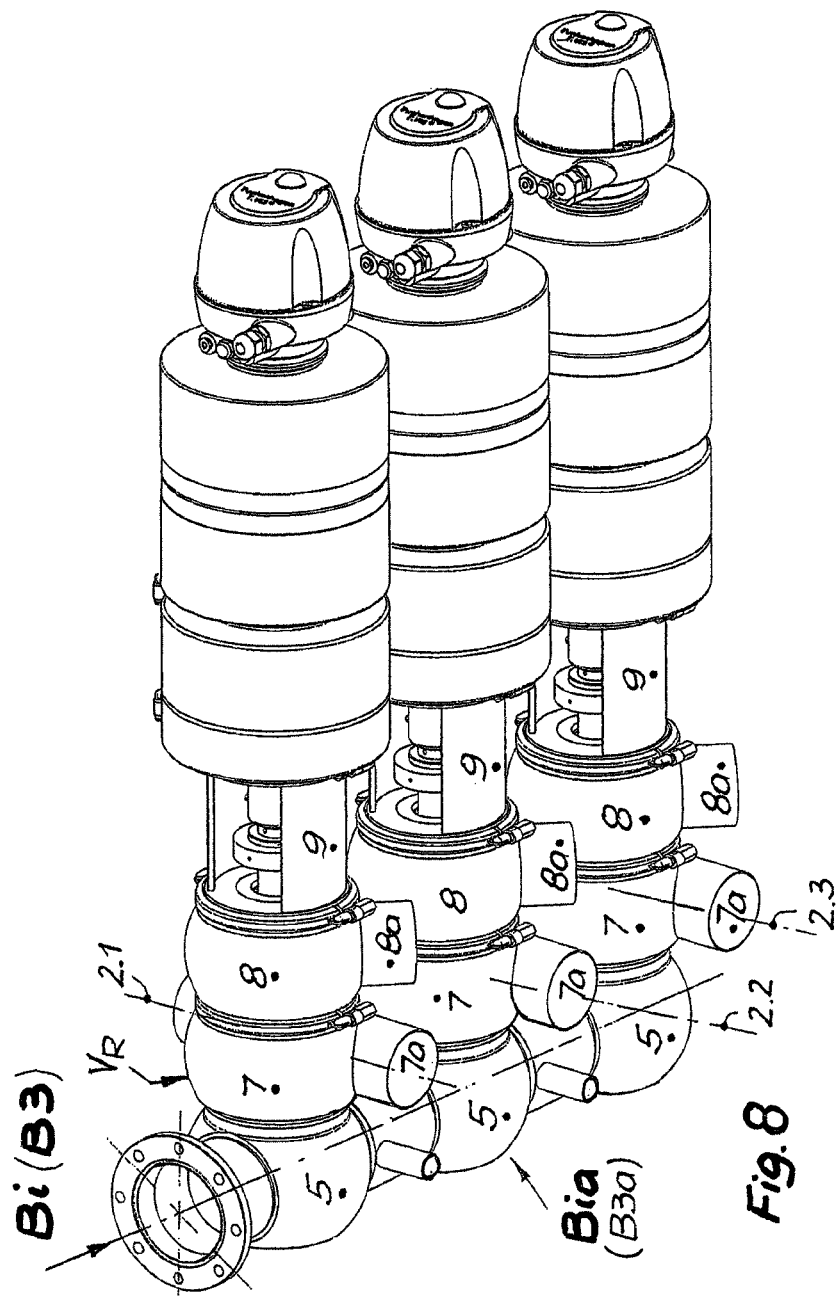

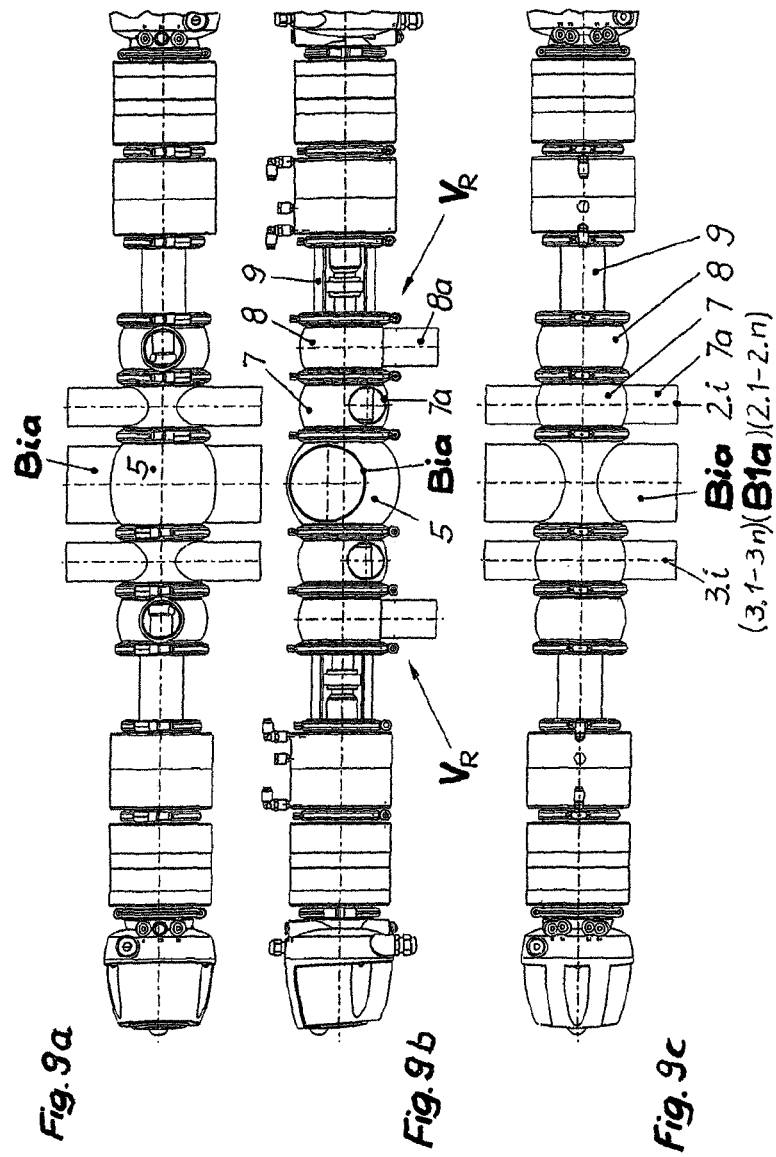

PIPING SYSTEM FOR PROCESS PLANTS IN THE FOOD AND BEVERAGE INDUSTRY

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The invention relates to a piping system for process plants in the food and beverage industry according to the preamble of claim 1, where these piping systems are used, in particular, in process plants that serve product processing and product transfer and that are subject to high microbiological quality requirements and requirements for the best clean in place capabilities (so-called CIP). The application also includes, in particular, the pharmaceutical and biotechnical fields.

The prototype of such a piping system is known, for example, from DE 101 08 259 C1, wherein the piping system is limited, however, to a piping arrangement in which a so-called valve distributor tree is assigned to a tank of a storage tank system opens directly from the tank bottom, and has a progression, as a rule, rising from below perpendicularly upwards. Here, the process lines and function valves are attached directly below the respective tank outlet. By now, this piping system has proven itself in practice; it is described in detail in the company literature GEA Tuchenhagen Brewery Systems, ECO-Matrix®, 223d-10/06 under the name ECO-Matrix®, and in particular, with respect to cost effectiveness and the influence on product quality.

BRIEF SUMMARY OF THE INVENTION

In the mentioned piping system, the function valves can be fastened either laterally at the tank outlet tree, the so-called valve distributor tree, or perpendicularly at the bottom flange of the tank. This piping technology significantly minimizes the formation of contamination and its later distribution in the process system. The piping system built separately from the tank makes possible a complete product discharge and independent cleaning of the tank. In comparison to traditional systems with so-called valve matrix systems disposed distant from the tank, in which a plurality of valves are grouped into so-called valve blocks for switching the various pipelines of the respective processes, this newer piping technology reduces the instrumental expenditure while the process can be optimized for a nearly loss-free production operation.

The valve distributor tree is designed as an elongated hollow body oriented essentially perpendicular and having connector openings for connecting its inner spaces to pipelines of a piping system which are led laterally past the valve distributor tree. A valve that is mix-proof in its seat region is disposed in each connection between the pipeline and the associated connector opening, and said valve switches this connection in immediate proximity to the hollow body. As a mix-proof valve a so-called double seat valve which has two closing members movable relative to each other, or a so-called double seal valve which has two seals offset in the stroke direction on a single closing member, or a so-called leakproof disk valve can be used. A leakage cavity, which is connected via at least one connecting path to the surroundings of the double seat valve, is located between the axially offset sealing zones of the mix-proof valve.

As a preferred mix-proof valve in the piping systems under consideration, the previously mentioned so-called double seat valve is used to date, wherein the latter has valve rods disposed concentrically within each other for the closing members which are led on one side through the valve housing and out of the valve housing to a drive. A double seat valve having such a closing member and valve rod configuration is already known from U.S. Pat. No. 4,436,106 A. The leakage cavity disposed between the two closing members is drained via a leakage outlet between the valve rod of the independently driven first closing member and a hollow rod surrounding the valve rod of the dependently driven second closing member. The second closing member is designed as a seat plate in the form of a conical closing sleeve that at its end facing the first closing member supports an axial seat seal which works together with the valve seat at the valve housing. The first closing member is also designed as a seat plate that works together with a conical valve seat.

EP 0 625 250 B1 describes a double seat valve according to the same type double seat valve of U.S. Pat. No. 4,436,106 A, in which the first closing member is designed having a radial seal means and the second closing member is designed having the known axial seal means. Here, the radial seal means, in the closed position of the valve, is received sealingly in a cylindrical seat, and the face surface of the second closing member designed as a cylindrical shaped closing sleeve, facing toward the first closing member, supports the seat seal acting axially on the seat at the valve housing. In EP 0 625 250 B1, with regard to the generic double seat valve according to U.S. Pat. No. 4,436,106 A, it is pointed out (see column 2, line 56 to column 3, line 16) that such double seat valves, assuming the arrangement position in FIGS. 1 and 2 of U.S. Pat. No. 4,436,106 A, can in principle be disposed in any installation position, thus for example, rotated by 180°, that is, perpendicular with downward oriented valve rods, or in a horizontal or sloped arrangement. In the case of downward directed valve rods, wherein this phrasing also includes the positioning of the valve rods in a sloped arrangement, the leakage fluid can independently, freely drain off due to gravity (via the annular gap between the valve rod and the hollow rod, FIG. 2).

From the publication WO 98/54494 A1, a double seat valve for the food industry is known, in which the hollow rod shaped second closing member at its end section facing the independently controllable first closing member, designed as a valve piston, has an axial/radially acting second seat seal on the outside and has a cylindrical receiving bore on the inside. The end section receiving the receiving bore extends somewhat beyond the second seat seal, and the receiving bore is formed with the same diameter as a cylindrical first seat, which acts together with a radially acting first seat seal of the first closing member. Due to the axial spacing of the second seat seal from the face side bounding surface of the end section of the second closing member, the seat seals and with them the assigned seats do not directly abut each other, but rather are connected together by a relatively long angled gap. In the closed position of the second closing member, the receiving bore and the first seat are merging together in a flush manner.

A type-defining pipe branching arrangement described in DE 10 2005 051 467 A1, assumes a piping system according to DE 101 08 259 C1, and in this system arranges at connections of the hollow body in each case a mixed proof valve in which the first closing member is independently driven and during its opening movement, comes into sealing contact with the second closing member designed as a seat plate, and transports the latter likewise into the open position. The second closing member, at its end facing the first closing member, has a second seat seal that acts together with a second seat bordering a cylindrical first seat. The first closing number, designed as a valve piston, has a radially acting first seat seal that in the closed position of the valve is received sealingly in the first seat. The valve rods for the closing members are disposed concentrically in each other, and are guided through, and out of, the valve housing on one side.

In this regard, the valve in DE 10 2005 051 467 A1, in the same manner as disclosed in EP 0 625 250 B1, regarding the generally possible installation positions in U.S. Pat. No. 4,436,106 A, is disposed in a sloped arrangement at the hollow body, and in addition to the radial sealing means at the first closing member and to the axial sealing means of the second closing member has a so-called middle seal which in the open position of the double seat valve is disposed effectively between the two closing members and at the second closing member. Due to the sloped arrangement, the leakage cavity of the valve has a peripheral wall that extends from a connection-side input up to the output-side leakage output opening that is offset from the input, and said wall is sloped on the side of the gravitational force toward the leakage outlet opening. The aim of this provision is to automatically discharge the leakage cavity of the leakage fluid collecting therein.

The known pipe distribution arrangement according to DE 10 2005 051 467 A1, and likewise the piping system according to DE 101 08 259 C1, is limited to an arrangement in which the hollow body (valve distributor tree) is assigned to a tank of a storage tank system and opens directly from its tank floor. The automatic drainage of the leakage cavity is only attained (DE 10 2005 051 467 A1) if the double seat valve is disposed in the necessary sloped arrangement at the hollow body, i.e. when the peripheral wall of the leakage cavity has a sufficient slope. Considering the design of the second closing member in the form of a conical closing sleeve, this requires a significant angle of inclination of the longitudinal axis of the double seat valve with respect to horizontal. The sloped connection of the double seat valve at the hollow body mandates, in each case, radially oriented, circumferential protrusions at the latter that form dead zones for the flow in the longitudinal direction of the hollow body. With flow through the hollow body, this results in stalling of the flow at these locations, and in turbulence. These protrusions are difficult to clean in the flow passage.

Furthermore, the so-called middle seal is a fundamental disadvantage because it makes the valve more complex and prone to failure, and in the course of the opening and closing motion, in particular, in a so-called picked-up position of the second closing member by the first closing member, impairs the desired preferably leakage-free switching of the double seat valve due to the formation of caverns between the three seals. Furthermore, in the known double seat valve, the seat cleaning flow arising during the respective seat cleaning of a closing member is directed onto the seal region of the other closing member in its closed position that, as a rule, is exposed to the product. This direct impact of the seat region by the respective seat cleaning flow is undesirable because it leads to a conversion of the kinetic flow energy into static pressure, whereby in the case of defective seat seals leakage flows of the cleaning agent are generated into the valve housing that is exposed to the product.

In the USA, for example, it is required in the case of larger seal defects, or even with a loss of one of the two seat seals, that in the course of the seat cleaning of the respectively other closing member no cleaning agent is permitted to pass through via the respective seal defect or the seat region without seat seal. Under these conditions, such a double seat valve does not only have to meet the requirement to limit the quantity of cleaning agent and to avoid a direct impact of the seat region in the course of the seat cleaning, but also the requirement to remove the seat cleaning flow as turbulence-free as possible, initially into the leakage cavity and from there into the surroundings, without the seat cleaning flow directly flowing against the respectively closed seat area or increasing the pressure on it. This case concerns the so-called PMO (pasteurized milk ordinance) capability, which means that the mix-proof double seat valve is in operation 365 days a year without interruptions for cleaning, and in the process is capable of the seat cleaning, while the respectively other side remains in contact with the product and thus closed.

The object of the invention is to create a piping system of the generic type, that satisfies at high operating reliability, the highest requirements on the quality of the fluid product handled therein, that overall including the mix-proof valves, is simple and cost-effective to build, and that in all arrangement variants of the valve distributor tree occurring in practice, with respect to the assigned process assembly or tank of the process plant in the respective valve distributor tree, forms to the greatest extent possible the same technological conditions and state variables as in the process assembly or tank. In addition, a direct impact of the seat region of the mix-proof valve during seat cleaning should be avoided, and the leakage cavity should be formed to be self draining

SUMMARY OF THE INVENTION

The object is also solved by a piping system with the features of claim 1. Advantageous embodiments of the proposed piping system according to the invention are the subject matter of the dependent claims.

The essence of the invention is that the fluid products flowing into or out of the pipe system flow through the hollow structure delimited by the valve distributor tree on the path via connector openings and that using a mix-proof double seat valve the respective fluid in this hollow structure can be separated, in a selectable, switchable and mix-proof manner, in the immediate vicinity of its boundary, from the pipelines of the piping system, led towards the associated connector opening(s) and past the hollow structure. The respective valve distributor tree opens directly into the lower tank floor of a respectively assigned tank of the process plant (first arrangement variant), and/or the respective valve distributor tree is connected via an assigned pipe connection to an assigned process assembly or tank of the process plant, and the end section of the pipe connection that is connected to the valve distributor tree runs perpendicularly or horizontally or sloped in any way (second arrangement variant). As a result, the piping system is very simple for the most diverse applications.

A further inventive concept is that the second closing member is designed as a hollow rod that at its end facing toward the first closing member has a second seat seal that acts together with a second seat abutting at a cylindrical first seat. The first closing member designed as a valve piston has a radially acting first seat seal that in the closed position of the valve is sealingly received in the first seat, which forms the connector opening. On the inside of the second closing member, shaped as a hollow rod, at its end section receiving the second seat seal, there is a cylindrical receiving bore that is formed with the same diameter as a cylindrical first seat. Furthermore, according to the invention, in the closed position of the second closing member, the receiving bore and the first seat are merging together in a flush manner. Thereby, a leak-free switching is attained without requiring a third seal means between the two closing members, as is the case with the type-defining distribution arrangement according to prior art (DE 10 2005 051 467 A1) described above.

Furthermore, it is provided that the second closing member having on the closing member side a stop surface that is disposed radially inwards from the second seat seal, has a metallic stop at the second seat, wherein an assigned seat-side stop surface is immediately adjacent to the first seat. This solution avoids a direct impact of the seat region of the double seat valve during the seat cleaning, and the leakage cavity is formed self discharging even in the case of a horizontal arrangement of the double seat valve. This measure further improves the PMO capability mentioned above of the double seat valve.

An advantageous embodiment provides that in the first alignment variant in which the valve distributor tree has a progression from below rising upwards, as a rule perpendicularly, the first and the second group of pipelines are arranged in each case below one another in an arrangement forming a row, and in planes parallel to each other and to the longitudinal axis of the hollow structure. Such a piping is exceptionally compact, space saving, and clearly arranged.

Another proposal provides that in the second alignment variant in which the valve distributor tree has a crosswise progression, as a rule progressing horizontally, the first and the second group of pipelines are each disposed in planes that are parallel and next to each other, and on one side or on the opposite sides of the hollow structures, and are led by the structure with their planes crossing its longitudinal axis. Such a piping is used when the installation height beneath the tank or the process assembly is limited, and therefore the arrangement of a valve distributor tree with an upward rising, as a rule perpendicular progression, is not possible and if also the entire relevant piping is to be arranged beneath the outlet of the tank or of process assembly.

According to a further proposal, the mix-proof double seat valve is designed with its drive such that it is subjected to a seat cleaning by a partial lift of its closing members.

Furthermore it is proposed, in order to limit the respective seat cleaning flow to a desired minimum flow volume, that the seat cleaning of the first closing member results from the first partial lift in the direction opposite to the opening movement, and that the seat cleaning of the second closing member results from the second partial lift in the same direction as the opening movement, and that in the respective seat cleaning position at the first closing member a first throttle gap is provided on the leakage cavity side, and at the second closing member a second throttle gap is provided facing away from the leakage cavity.

Thereby it is possible to subject at least one mix-proof double seat valve disposed at the hollow structure not only to a cleaning of its leakage cavity in the closed position and in the open position, but also to a seat cleaning of the one sealing location when the respectively other sealing location remains in the closed position. Thus, the proposed device makes it possible to perform all currently typical valve cleanings that are in the seat region of the valve, as they are also possible with conventional valve blocks having the named double seat valves.

The hollow structure permits a very simple connection of the mix-proof double seat valve, if it is designed in the perimeter region of its connector opening as an annular housing that receives the two seats and serves the connection of the valve housing.

If, as is provided in a further proposal, the second closing member, designed as a hollow rod, preferably in the form of a substantially cylindrically extending closing sleeve, is designed to have a cylindrical outside lateral surface, then the leakage cavity on the inside of the hollow rod shaped second closing member can be provided on its entire axial extension with a maximally possible passage cross-section.

It is further proposed that the second closing member opens into a leakage and drainage housing that connects to the latter at the side of the valve housing facing away from the annular housing, and is led there and sealed. Thereby the leakage cavity can be provided on its entire axial extension length with a passage cross-section that corresponds to the largest nominal passage cross-section of the pipeline connected to the valve housing (satisfying the so-called 3A requirement in the USA), and the leakage can be collected in the leakage and discharge housing, and can be reliably drained from there. Furthermore, the radial guidance of the second closing member is improved during its opening and closing movement because it is guided additionally in the leakage and discharge housing.

The above solution permits a transition of the second closing member in the region of the inner space of the leakage and discharge housing to the second valve rod that is smaller in diameter, and it provides a nearly undiminished fluid permissible connection between the inner space of the hollow rod shaped second closing member and the inner space of the hollow cylinder second valve rod via at least one substantially radially oriented traverse.

Due to the transition of the second closing member to the second valve rod, having a substantially smaller diameter, in the region of the leakage and discharge housing, the valve rods disposed concentrically within one another can be guided at the side of the leakage and discharge housing facing away from the valve housing, through and out of the latter at a small diameter. This provides a particularly reliable seal of second valve rod with respect to the leakage and discharge housing, and therefore to the surroundings.

It is further provided that the leakage cavity is connected via a drain bore limited by an inner lateral surface of the second closing member to the interior of the leakage and discharge housing, which empties into the drain connection. Thereby the leakage cavity has the greatest possible radial extension and it extends in the radial direction undiminished into the leakage and drainage housing, which as a closed space completely receives the leakage, and discharges it all via the drain connection.

In order to be able to completely empty the round bodied valve housing it is further proposed that a pipe connection at the valve housing opens tangentially, relative to the arrangement position of the valve housing, with its lowest inner surface line at the deepest point of the interior of the valve housing.

An automatic discharge of the leakage cavity is insured or particularly favored when, as is provided, relative to the arrangement position, the longitudinal axis of the valve housing is horizontal or, viewed from the connection opening, runs at a downward sloping angle relative to the horizontal, and if in the process an inner peripheral wall of the leakage cavity has a slope towards its output opening on the side of the gravitational force.

In order to be able to clean the leakage cavity independently from cleaning options in the course of the seat cleaning, both in the closed and in the open position of the double seat valve, a further proposal provides that a cleaning agent connection is disposed in a lantern housing connecting to the leakage and discharge housing; said cleaning agent connection is connected to an annular gap formed between the valve rods, wherein the latter opens into the leakage cavity at its end facing away from the cleaning agent connection via a cleaning nozzle. Using this cleaning agent connection, cleaning agent can be introduced from the surroundings of the double seat valve into the leakage cavity.

So that the first closing member in the course of the opening movement, after entering into the cylindrical receiving bore within the second closing member attains contact with the latter, and can take the first closing member along on the further opening travel, without hindering leakage drainage through a radial protrusion within the drain bore or the adjoining inner lateral surface, it is proposed that a first annular stop is provided radially at the outside of the valve rod which in the course of the opening movement of the valve acts together with a corresponding annular second stop at the inside of the second valve rode, and here at the time of the second closing member being taken along by the first closing member.

For minimizing product loss, for example during a change from the product travel to flow cleaning (CIP cleaning) of the pipelines, the pipeline being considered is designed piggable. For this purpose, it is proposed that the relevant pipeline is designed to be continuous with an unobstructed circular passage cross-section, and is led past a respective valve housing of the double seat valve and is connected to the latter in a manner to let fluid pass.

The implementation of the hollow structure turns out to be particularly simple if it is designed as a cylindrical pipe, as is further provided.

The hollow structure makes the completely emptying and perfectly cleaning possible, if its lower end facing away from the respective tank or from the pipe connection leading from the process assembly or tank, is connected to a third pipe system.

The device is particularly clearly laid out and simple if the pipelines according to a further proposal are each designed as continuous pipelines assigned to all pipe connections with the same function (filling; emptying; cleaning).

In the scope of a piping system, simple and clearly laid out arrangements of the pipelines result when the valve distributor trees have a row or matrix arrangement.

As an alternative to the design of the hollow structure in the form of a cylindrical pipe, it is further provided that the hollow structure in each case is made up of an aggregation of individual structure sections, which are connected together so that fluid can pass in the direction of the longitudinal axis of the hollow structure, and each has at least one connector opening. These housing sections can be either discrete, separate pieces that are added to the hollow structure in its entirety, or can be a one-piece entity in which the individual housing parts are connected together in a material locking manner.

In both stated embodiment variants, according to a further proposal, the structure sections are designed in the form of housing parts with different sizes, so that at these housing parts, if necessary, and is also provided, at least one connector opening can be implemented which has a passage cross-section depending on the size of the respectively associated housing part. Connector openings having differently sized passage cross-sections are also provided at a housing part. Due to this design diversity, the hollow structure can be adapted, in all of its areas that have through flows, to the different flow requirements of the connected pipes with different nominal widths.

BRIEF DESCRIPTION OF THE SEVERAL
VIEWS OF THE DRAWINGS

Figure 2:
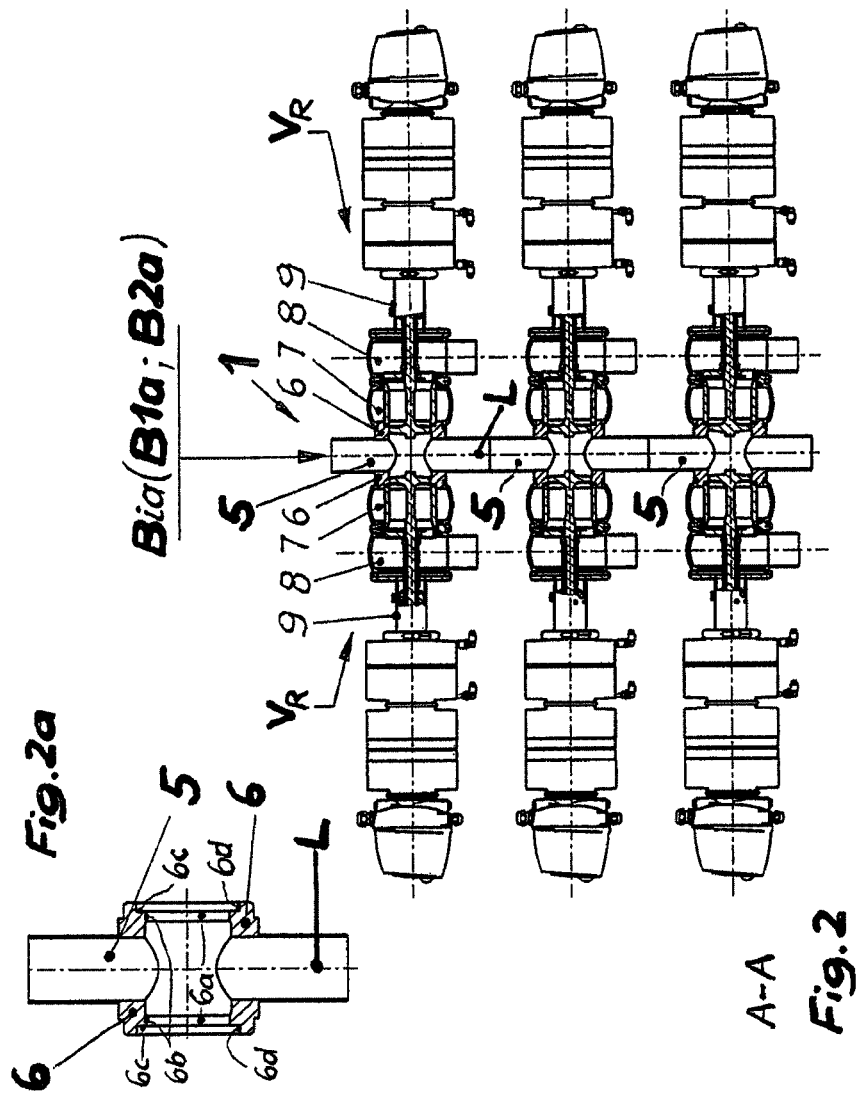
Figure 3:
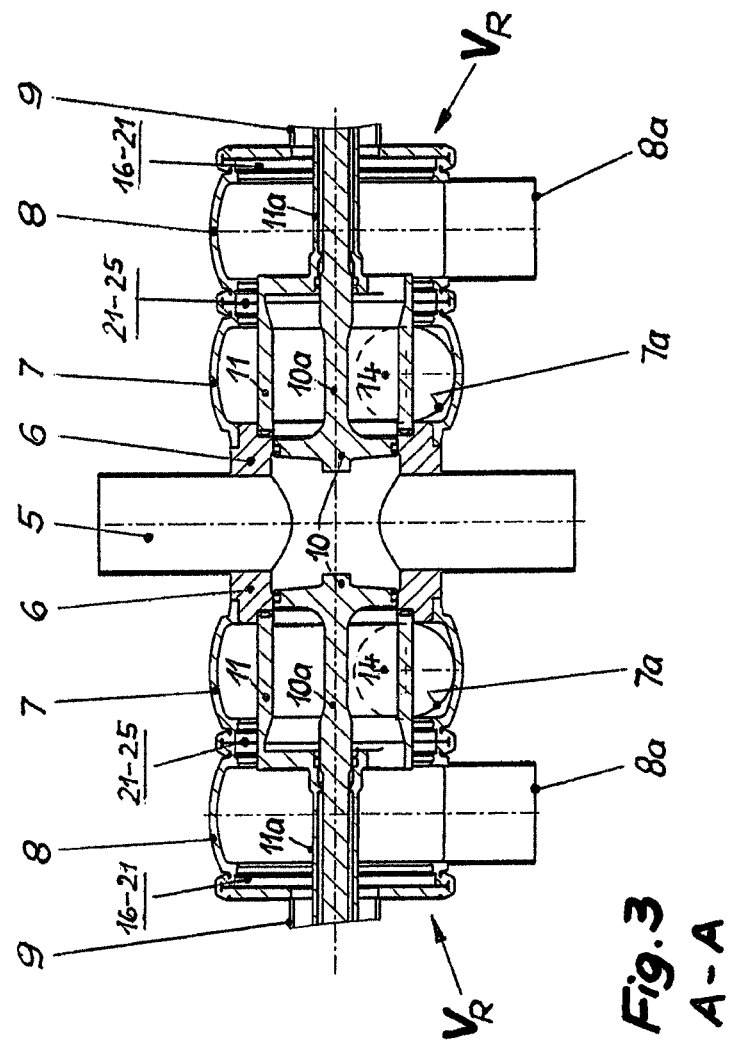
Figure 6A:
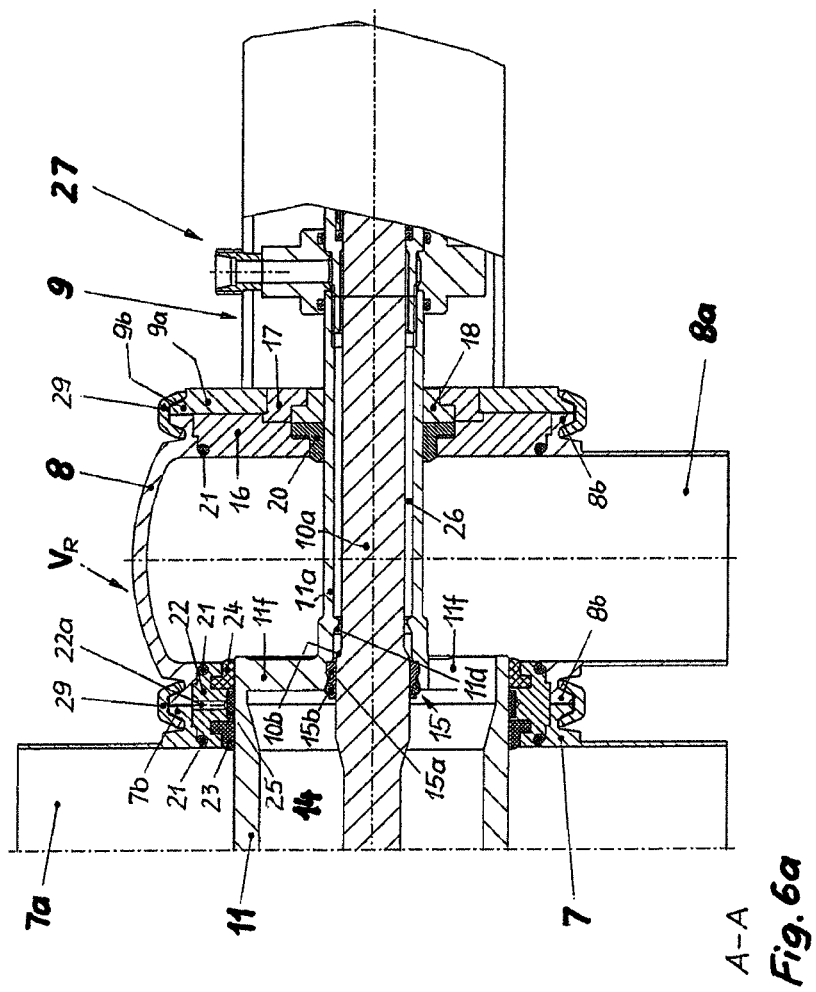
Figure 7:
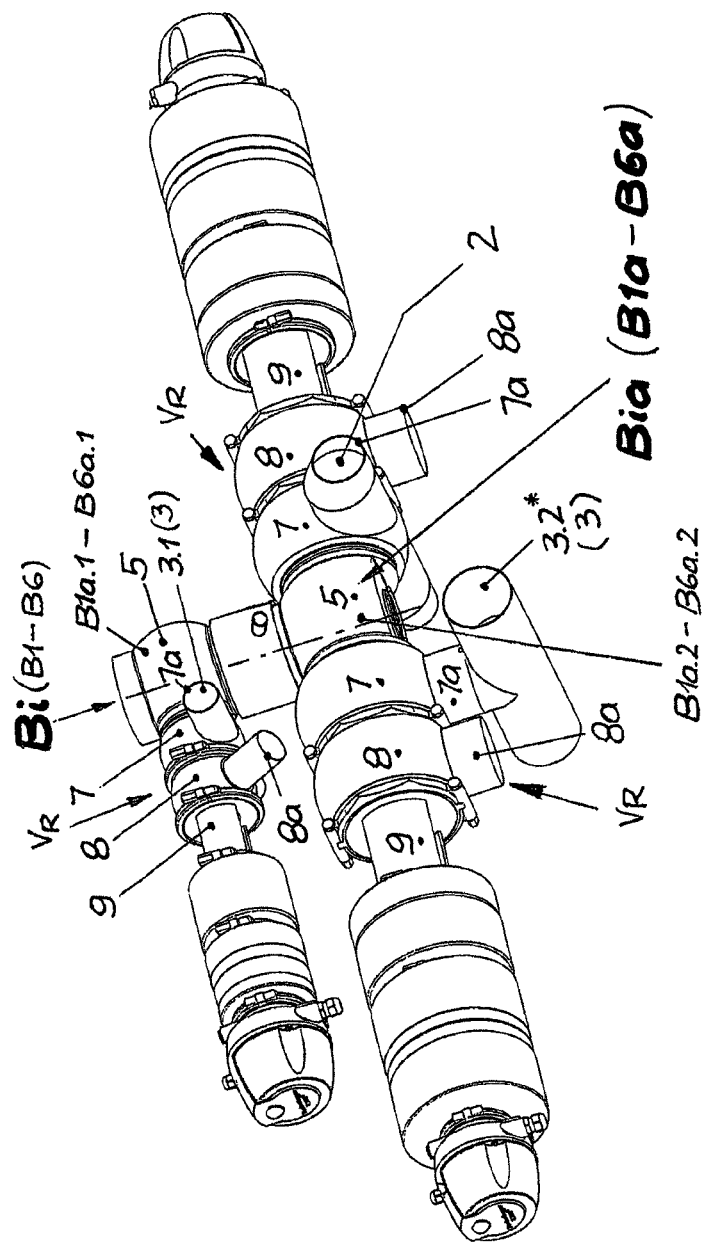

Embodiment examples of the device for installing piping in process plants in the scope of the first and second arrangement variants, and in the first and second direction variant according to the invention are represented in the figures shown the drawings, and are described in the following with respect to design and function. They show:

FIG. 1 a partial schematically represented perspective of a device according to the invention having three valve distributor trees aligned in a row arrangement, wherein pipe systems are led past and connected at the hollow structures of the two front valve distributor trees in each case on both sides, opposite each other, in planes that are parallel to each other and to the longitudinal axis of the hollow structure, and the third hollow structure is disposed in front of a wall and is connected on one side to the associated pipe system FIG. 2 a center cut through the front valve distributor tree according to FIG. 1 corresponding to a cutting line indicated there with A-A, wherein corresponding center cuts of the two other valve distributions trees in the present example embodiment with the identically placed components have the same representations;

FIG. 2*a* an enlarged representation of a center cut through one of the three structure sections forming the hollow structure according to FIG. 2 having an annular housing provided in the perimeter area of each of its connector openings;

FIG. 3 in a further enlarged representation of the center cut through one of the structure sections according to FIG. 2 having mix-proof double seat valves connected on both sides, wherein these are each represented in their closing member and valve housing area;

FIG. 4 a view of an advantageous first embodiment of the structure sections in a material locking connection to a valve housing disposed on each side, each having the same nominal diameter, that respectively has on both sides tangentially disposed pipe connections, wherein the viewing direction is from below, relative to arrangement position, and the connection points between the structure section and the respective valve housing are each represented in a meridian running partial section;

FIG. 4*a* a cut through a structure section according to FIG. 4 corresponding to a cutting line indicated there with B-B;

FIG. 4*b* a top view of the structure section according to FIG. 4;

FIG. 4*c* the lateral view of the structure section according to FIG. 4, wherein the representation contains partial sections through the clamping flanges on both sides, and details in the area of the junctions between the structure section and the valve housing corresponding to a cutting line in FIG. 4, indicated with C-C;

FIG. 5 a view of an advantageous second embodiment of the structure section in a material locking connection to valve housings disposed on each side, each having a different nominal diameter, one of which has centrally disposed pipe connections on both sides, and the other has a centrally disposed pipe connection on one side, wherein the viewing direction is from below, relative to the arrangement position, and the connection points between the structure section and the respective valve housing are each represented in a meridian running partial section;

FIG. 5*a* a cut through a structure section according to FIG. 5 corresponding to a cutting line indicated there with D-D;

FIG. 5*b* a top view of the structure section according to FIG. 5;

FIG. 5*c* the lateral view of the structure section according to FIG. 5, wherein the representation contains partial sections through the clamping flanges on both sides, and the details in the area of the junctions between the structure section and the valve housing corresponding to a cutting line in FIG. 5 indicated with E-E;

FIG. 6 a more accurately detailed center cut through a structure section in conjunction with a mix-proof double seat valve disposed on the right side, corresponding to the cutting line in FIG. 1 indicated with A-A and FIG. 6a in a center cut details of the double seat valve according to FIG. 6 with respect to the guidance and sealing of the second closing member in the area between the valve housing and the leakage and drainage housing, and of the second valve rod in the area between the leakage and drain housing and the lantern housing;

FIG. 7 a perspective representation of a valve distributor tree having mix-proof double seat valves connected on both sides, and above that, having a mix-proof double seat valve connected on one side, wherein the structure sections are designed in the form of housing parts of different sizes;

FIG. 8 a perspective representation of the device according to the invention in the second arrangement variant seen in FIG. 1, with mix-proof double seat valves connected on one side to a perpendicularly disposed valve distributor tree (first direction variant), and FIGS. 9a to 9c a bottom view, view and top view of a specific embodiment of a structure section of the hollow structure with mix-proof double seat valves disposed on both sides, wherein the valve distributor tree is in a horizontal arrangement (second direction variant of the first or second arrangement variants).

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated While the invention can be implemented in different embodiments, the drawings show particularly preferred arrangement variants and direction variants in the scope of the proposed fundamental solution, and these are described in the following with the understanding that they only represent examples of the invention, but the invention is not limited to the specifically represented examples.

DETAILED DESCRIPTION

A device 1 for installing piping in process plants consists, for example, of three valve distributor trees B1, B2 and B3, in the most general case B1 to Bn, which are preferably disposed in rows and aligned flush next to each other. Each valve distributor tree B1, B2, B3 (Bi) is designed as a longitudinally extending hollow structure B1*a*, B2*a*, B3*a* (in the most general case B1*a* to Bna; Bia), preferably in the form of a cylindrical pipe or of an aggregation of individual structure sections 5 (see FIG. 2), which progress from below rising upwards, as a rule, perpendicularly (first direction variant). The represented device 1 further shows a first pipe system 2, which is composed of a first group of pipelines 2.1, 2.2, 2.3 (in the most general case of pipelines 2.1 to 2.*i* to 2.*n*), and a second pipe system 3, which is composed of a second group of pipelines 3.1, 3.2, 3.3 (in the most general case of pipelines 3.1 to 3.*i* to 3.*n*). Each of the lower ends of the respective valve distributor trees B1 to B3 can be connected, in the present case, to a third pipe system 4, not shown (for cleaning, for example), if this location or access is not required for other provisions.

The first group of pipelines 2.1, 2.2, 2.3 and the second group of pipelines 3.1, 3.2, 3.3 are each disposed in a row arrangement below one another and, in reference to the front two valve distributor trees B1 and B2, disposed on opposite sides of the hollow structure, in two planes parallel to each other and to the longitudinal axis of the hollow structure, and led past it (two-sided arrangement of the mix-proof double seat valves $V_R$). The third hollow structure B3*a* is located, for example, directly in front of a vertical wall so that only the first pipe system 2 is led past it and connected (one-sided arrangement of the mix-proof double seat valves $V_R$).

A perspective representation of the arrangement substantially corresponding to the rear valve distributor tree is shown in FIG. 8. The hollow structure B1*a*, B2*a*, B3*a* has connector openings 6*a* (FIGS. 2 and 2*a*) for connecting its interior space to each of the pipelines 2.1, 2.2, . . . , 2.*i*, . . . , 2.*n* and 3.1, 3.2, . . . , 3.1, . . . , 3.*n*, and possibly 4. In each of these connections a mix-proof double seat valve is disposed that switches this connection in the immediate vicinity of the hollow structures B1*a*, B2*a*, B3*a*.

The previously mentioned double seat valves $V_R$ are used in the device represented in FIG. 1; similarly suitable so-called double seal valves, do not differ substantially from the latter as viewed from the outside. In a similarly possible application of leakage-proof disc valves, a different appearance results with respect to the drive and the leakage and drainage housing for the switching leakage and the cleaning agent from the cleaning of a leakage cavity, because the respective drive is disposed perpendicularly the axis of symmetry of the associated connector opening 6*a*, and the switching leakage and the cleaning agent are, as a rule, led directly out of the leakage and drainage housing into the surroundings Layout and progression of the pipe systems 2 and 3, and possibly 4 are substantially independent from the type of mix-proof valve used.

As indicated in FIG. 1, the respective valve distributor tree B1 to B3 (in the most general case B1 to Bi to Bn), either opens directly into the lower tank bottom T1*a* to T3*a* (in the most general case T1*a* to Tia to Tna) of the respectively associated tank T1 to T3 (tank T; in the most general case T1 to Ti to Tn) of the process plant (first arrangement variant), or is connected via an associated pipe connection R (R1 to R3; in the most general case R1 to Ri to Rn) to an assigned process assembly P (P1, P2; in the most general case P1 to Pi to Pn) or tank T1 (tank T; in the most general case T1 to Ti to Tn) of the process plant, and the pipe connection R. (R1 to R3; in the most general case R1 to Ri to Rn) opens into the upper end of the valve distributor tree B1 to B3 (B1 to Bi to Bn) (second arrangement variant). The two fundamental arrangement variants mentioned above can also occur in one device 1 (mixed form).

In the second arrangement variant, the upper end of the first valve distributor tree B1 is connected via the first pipe connection R1, for example, to a first process assembly P1, the second valve distributor tree B2 is connected via a second pipe connection R2 to a first tank T1, and the third valve distributor tree B3 is connected via a third pipe connection R3 to the second process assembly P2. The pipe connections R1, R2 and R3 are in the most general case assigned pipe connections R, which can consist of a number I=1 to n pipe R1 to Rn.

In the second arrangement variant the process assembly P or the tanks T can take on any arrangement and positioning, whereas the valve distributor trees B1 to Bn are disposed in row or matrix formation. In the represented pipe connections R1 to R3 (R1 to Rn), in the area of their end section connected to the valve distributor trees B1 to B3 (B1 to Bn), the end section can each be perpendicular or an end section sloped in any way. The sloping end section that in the limit case runs horizontally is connected via a corresponding curved pipe to the tank or process assembly side end of the respective valve distributor tree B1 to B3 (B1 to Bn).

The valve distributor trees Bi can, as represented later in detail, also be disposed horizontally (second direction variant). The preceding explanations apply correspondingly to the connection of the respective horizontally disposed valve distributor tree Bi to the associated tank or process assembly Pi.

FIG. 2 shows that the hollow structure B1$a$, B2$a$ (in the most general case Bi$a$) can, for example, be composed of three equal structure sections 5, wherein each structure section 5 (FIG. 2$a$) is designed in the perimeter area of its connector openings as an annular housing that accepts on its inside a first seat 6$b$, a second seat 6$c$ and a cylindrical recess 6$d$. The annular housing 6 is connected, in each case, crosswise to the longitudinal direction (longitudinal axis L) of the structure section 5, on both sides, to a first valve housing 7 (see also FIG. 3), at whose pipe connection 7$a$, the pipelines 2.1, 2.2, ..., 2.$i$, ..., 2.$n$ and 3.1, 3.2, ..., 3.1, ..., 3.$n$ are led (see also FIGS. 1, 7, 8, 9$c$). In the exemplary embodiment (FIG. 3) the pipe connection 7$a$ at the valve housing 7, relative to the arrangement position, opens tangentially with its lower inner peripheral line at the lowest point into the interior of the valve housing 7 (see also FIGS. 4 to 4C, 7, 9$a$ to 9$c$).

The valve housing 7 is part of the mix-proof double seat valve $V_R$. The valve housing 7, viewed in the longitudinal direction of the double seat valve $V_R$, connects laterally to a leakage and drainage housing 8 (FIGS. 3, 2) to a drainage connection 8$a$, and to a drive, not indicated in more detail, wherein the latter is connected to the leakage and drainage housing 8 via a lantern housing 9.

The double seat valve $V_R$ is designed with two serially disposed closing members 10, 11 that in the closed position of the valve prevent the overflow of fluid from the hollow structure Bi$a$ or from the structure section 5 into the valve housing 7. The closing members 10, 11 in both the closed position and open position delimit a leakage cavity 14 which has it least one connection path to the surroundings of the double seat valve $V_R$. In the represented exemplary embodiment, the interior of the leakage and drainage housing 8 and its drainage connection 8$a$ are part of the connection path. A further connection path is described in the exemplary embodiment of FIGS. 6 and 6$a$. The first closing number 10 is connected to a first valve rod 10$a$, and the second closing member 11 is connected to a second valve rod 11$a$, which are disposed concentrically within one another and are led on one side through the first valve housing 7 and out of it via the leakage and drainage housing 8 to the drive. The guidance and sealing of the second closing member 11 in the area 21-25 between the housing 7, 8, and of the second valve rod 11$a$ in the area 16-21 between the housings 8, 9 is described in the explanation for FIGS. 6 and 6$a$.

An advantageous embodiment of the structure section 5, its two annular housings 6, and each valve housing 7 connecting thereto are shown in the FIGS. 4 to 4$c$. Here, the structure section 5 and the two annular housings 6 are designed as one-piece, and the first valve housing 7 comprises respectively the annular housing 6 radially outwards and is connected to this in a material locking manner, preferably by welding. The connector opening 6$a$ indicated in FIG. 2A forms with its peripheral boundary the cylindrical first seat 6$b$ for the first closing member 10. A flushing connection 28 can be provided, as shown, for flushing and/or drainage of the leakage cavity 14. The pipe connections 7$a$ are, as already described above, tangentially connected to the first valve housing 7. The first valve housing 7 has at its end facing towards the leakage and drainage housing 8, a first clamping flange 7$b$, via which it is detachably connected to the leakage and drainage housing 8 via a so-called clamping ring 29 (FIG. 6$a$).

The FIGS. 5 to 5$c$ show a housing configuration modified with respect to the FIGS. 4 to 4$c$. The difference is that both first valve housings 7 are no longer designed to have the same size, but rather, that a second valve housing 7* is dimensioned smaller than the first valve housing 7, and that pipe connection 7$a$ assigned to the first valve housing and modified pipe connection 7$a$* assigned to the second valve housing 7* are each lead centrally out respective valve housing 7, 7*. The modified pipe connection 7$a$* is provided with a second clamping flange 7$b$* with which it is connected to a leakage and drainage housing 8, not shown, of corresponding nominal width, by means of a further clamping ring 29.

The FIGS. 6 and 6$a$ show further details of the mix-proof double seat valve $V_R$. Of the valve distributor tree Bi, only one structure section 5 is singled out (FIG. 6), wherein the valve distributor tree Bi is connected via a pipe connection Ri to a process assembly Pi or to a tank Ti. Starting from the already previously represented features of the double seat valve $V_R$, it should be added that the first closing member 10 is driven independently and that during its opening motion comes into contact at the second closing member 11 formed as a seat plate, and transfers this too into the open position. The second closing member 11 is designed as a hollow rod, preferably as a cylindrical closing sleeve or tubular, and at least nearly cylindrical on the inside and outside, that at its face end towards the second closing member 10 has an axially acting second seat seal 13 that acts together with the second seat 6$c$ abutting at the cylindrical first seat 6$b$. The first closing member 10, designed as a valve piston, has a radially acting first seat seal 12 that in the closed position of the double seat valve $V_R$ is received sealingly in the first seat 6$b$. Here, the cylindrical first seat 6$b$ is formed in the peripheral wall delimiting the connector opening 6$a$.

The second closing member 11 at its end section receiving the second seat seal 13, has on the inside a cylindrical receiving bore 11$b$ that is formed with the same diameter as a cylindrical first seat 6$b$. In the closed position of the second closing member 11, the receiving bore 11$b$ and the first seat 6$b$ are merging together in a flush manner so that a leak-free switching is given with only two seat seals 12, 13.

The double seat valve $V_R$ is subjected to a seat cleaning through a respective partial lift H1, H2 of its closing members 10, 11. The seat cleaning of the first closing member 10 occurs through the first partial lift H1 in the direction opposite to the opening movement with an opening lift H, and the seat cleaning of the second closing member 11 occurs through a second partial lift H2 in the same direction, wherein the respective other closing member 11, 10 remains in its closed position. In the respective seat cleaning position, a leakage cavity side first throttle gap D1 is formed at the first closing member 10, and a second throttle gap D2 is formed at the second closing member 11 on the side facing away from the leakage cavity. The first throttle gap D1 is bounded here by the outer diameter of the first closing member 10 (valve piston) and by the cylindrical first seat 6$b$, and the second throttle gap D2 is bounded by the outer peripheral surface 11$e$ of the hollow rod shaped second closing element 11 and by the cylindrical recess 6$d$ in the annular housing 6.

In the closed position of the second closing member 11, which is taken on also in the seat cleaning position of the first closing member 10, the second closing member 11 with a closing member side stop surface 11$g$, which is disposed radially inwards with respect to the second seat seal 13, has a metallic stop at the second seat 6$c$, wherein an assigned seat side stop surface abuts directly at the first seat 6b. Due to this arrangement, in addition to the otherwise optimal arrangement geometry of the seats to each other, the seat area of the second closing member 11, in the course of the seat cleaning of the first closing member 10, is protected very effectively from direct contact with the seat cleaning flow. A direct impact of the seat region of the first closing member 10 in the course of the seat cleaning of the second closing member 11 is also excluded because the assigned a seat cleaning flow enters crosswise to the first seat 6b and enters collision-free into the leakage cavity 14 with an offset from the adjacent end section of the first closing member 10 and its first seat seal 12.

The second closing member 11 designed as a hollow rod is designed cylindrical at its outer peripheral surface 11e, and opens into the leakage and cavity housing 8 (FIG. 6a), which is connected to the valve housing with a third clamping flange 8b at the side of the valve housing 7 facing away from the annular housing 6. The clamping ring 29 provides a detachable connection. The outer peripheral surface 11e is guided and sealed in the connection area between the valve housing 7 and the leakage and drainage housing 8. This guidance and sealing is provided by a drainage ring 22 which is sealed radially on the outside via two axially offset housing seals 21 in the valve housing 7 and in the leakage and drainage housing 8. A drainage bore 22, which extends in the radial direction through the drainage ring 22a, opens between these housing seals 21. Two axially offset rod seals 23 and 24, between which a guide ring 25 is disposed, perform the inner side seal of the drainage ring 22 relative to the hollow rod shaped second closing member 11 penetrating it.

The second closing member 11 merges in the area of the interior of the leakage and drainage housing 8 into the smaller diameter second valve rod 11a, and a fluid passable connection is provided between the interior of the second closing member 11 and the interior of the hollow rod shaped second valve rod 11a via an at least substantially radially oriented traverse 11f. The valve rods 10a, 11 are guided through and out of the leakage and drainage housing 8 at the side facing away from the valve housing 7, where they axially penetrate the lantern housing 9 and are led to a drive, not shown, of the double seat valve $V_R$. The leakage cavity 14 is connected, via a drainage bore (FIG. 6) delimited by an interior peripheral surface 11c of the second closing member 11, to the interior of the leakage and drainage housing 8, which opens into the drainage connection 8a.

The leakage and drainage housing 8 is closed on the lantern housing side by a cover part 16 (FIG. 6a) which is sealed on the housing side by means of a further housing seal 21, and on the valve rod side by means of a first rod seal 20. The cover part 16 is form-fit and force-fit via a lock plate 9a fastened to the lantern housing 9. The connection between the leakage and drainage housing 8 provided with the third clamping flange 8b, and the locking plate 9a provided with a corresponding fourth clamping flange 9b, occurs via a further clamping ring 29. The form-fit and force-fit embedding of the first rod seal 20 is effected via a second ring 18 which is fixed in position via a first ring 17 in the locking plate 9a.

In the lantern housing 9 connecting to the leakage and drainage housing 8, a cleaning agent connection 27 is disposed which is connected to an annular gap 26 formed between the valve rods 10a, 11a, wherein the annular gap at its end facing away from the cleaning agent connection 27 opens into the leakage cavity 14 via a cleaning nozzle 15. The cleaning nozzle 15 consists of a nozzle insert 15a and a locking ring 15b fixing it in its position.

An annular first stop 10b is provided radially on the outside the valve rod 10a, which acts together with a corresponding annular second stop 11d at the inner side of the second valve rod 11a, in the course of the opening movement of the double seat valve $V_R$, and here at the moment of the second closing member 11 being carried along by the first closing member 10.

The represented horizontal arrangement of the double seat valve $V_R$ represents a preferred arrangement which is possible because even in this position the previously described embodiment of the double seat valve $V_R$ provides an automatic emptying of the leakage cavity 14 without ponding. In the most general case, with respect to a possible arrangement positions, an arrangement of the double seat valves $V_R$ at the respective hollow structure Bi, declining on the side of the gravitational force, already known from U.S. Pat. No. 4,436,106 A, is provided, wherein relative to the arrangement position, the longitudinal axis of closing members 10, 11 disposed concentrically in each other, and their valve rods 10a, 11a is horizontal, or viewed from the closing members 10, 11 run at an angle declining with respect to horizontal, and wherein a peripheral line of the interior peripheral surface 11c, running at the lowest point, is also at least horizontal or runs below at an angle declining with respect to horizontal.

The hollow structure B1a to Bna can also be combined in each case also from an aggregation of a number of individual structure sections 5 (see FIGS. 1, 2, 2a, 7), that are connected together in the direction of the longitudinal axis L of the valve distributor tree B1 to Bn in a fluid-permissible manner, and each having at least the connector opening 6a on at least one side. The structure sections 5 can be designed with different sizes in the form of housing parts B1a.1 to B6a.1 and B1a.2 to B6a.2 (see FIG. 7; in the most general case Bia.1 to Bia.m with housing parts 1 to m of the hollow structure Bia), wherein the respective connector opening 6a can have, for example, a passage cross-section depending on the size of the respectively assigned structure section 5. Different size passage cross-sections of the connector openings 6a are also implemented, as needed, with more than one connector opening 6a at the respective structure section 5.

FIG. 7 shows that the hollow structure B1a to B6a in a device consisting of six valve distributor trees B1 to B6 (in the most general case Bia) can be composed, for example, of two structure sections 5. The valve housing 7 of the double seat valve $V_R$ connects on both sides to the annular housing 6 (for this, see FIG. 2a) of the lower structure section 5, in each case cross-wise is to its longitudinal direction, and the single pipeline 2 of the first pipe system 2 is led to the pipe connection 7a (right side) of said housing. In the exemplary embodiment the pipe connection 7a at the valve housing 7, relative to the arrangement position, opens with its lowest inner peripheral line tangentially at the lowest point of the interior of the valve housing 7.

The valve housing 7 disposed on the left side of the lower structure section 5 opens via the perpendicular downward oriented pipe connection 7a into a piggable second pipeline 3.2* from the second pipeline group of the second pipe system 3. This pipeline 3.2* is designed continuous having a passage cross-section that is unobstructed and circular in shape, whereby it is continuous for a pig; it is led past the associated valve housing 7 of the mix-proof double seat valve $V_R$ and connected to the latter in a fluid-passable manner. In principle, each of the pipelines 2.1 to 2.n of the first group of pipelines of the first pipe system 2, and each of the pipelines 3.1 to 3.n of the second pipeline group of the second pipeline system 3, and possibly also the third pipe system 4, are designed piggable in the manner described above. The valve housing 7 of a further double seat valve $V_R$ is only disposed on the left side at the upper structure section 5 (FIG. 7), the first pipeline 3.1 from the second pipeline group of the second pipe system 3 is led to its pipe connection 7a. In the exemplary embodiment the pipe connection 7a at the valve housing 7, relative to the arrangement position, opens with its lowest inner peripheral line tangentially at the lowest point of the interior of the valve housing 7.

The respective valve housing 7 is part of the mix-proof double seat valve $V_R$. The valve housing 7, viewed in the longitudinal direction of the double seat valve $V_R$, laterally connects to the leakage and drainage housing 8 with the drainage connection 8a, and to a drive, not indicated in more detail, wherein the latter is connected to the leakage and drainage housing 8 via the lantern housing 9.

FIG. 8 shows the respective one-sided arrangement of three mix-proof double seat valves $V_R$ disposed above one another at a perpendicularly disposed valve distributor tree B3 (in the most general case Bi) corresponding to the piping in FIG. 1 that was already described (there, the rear valve distributor tree B3). With respect to the further design of this aggregation reference is made to the embodiment in FIG. 7.

The FIGS. 9a to 9c show an advantageous embodiment of the structure section 5, from which the hollow structure B1a (Bia) of the valve distributor tree B1 (Bi) is composed, having mix-proof double seat valves $V_R$ disposed on both sides and aligned flush with each other, as they are preferably used in a horizontally arranged valve distributor tree B1 (Bi) (second direction variant). For avoiding ponding and thus attaining complete emptying of residual, the pipe connection 7a is disposed tangential at the lower area of the valve housing 7. The hollow structure B1a (Bia) which in each case has the shape of a pipeline section having a circular cross-section, opens into the upper area of the structure section 5 in such a way that avoiding a sump-forming space in the structure section 5 beneath the hollow structure B1a (Bia) by special shaping measures, a residue-free discharge of the fluid from the latter into the valve housings 8 connected on both sides is guaranteed.

In the second direction variant, the valve distributor tree Bi runs crosswise, as a rule horizontally, and the first and possibly the second group of pipelines 2.1 to 2.n and 3.1 to 3.n are each disposed next to each other in planes parallel to each other, and on the one side or on opposite sides of the hollow structure Bia, in planes intersecting with its longitudinal axis L, are led past the hollow structure. Such a piping is used when the installation height within the tank Ti or the process assembly Pi is limited, and therefore the arrangement of a valve distributor tree Bi with progression rising upward from the bottom to the top, as a rule perpendicular, is not possible, and if also the entire relevant piping is to be arranged beneath the outlet of the tank Ti or of process assembly Pi.

From the above description it is understood that different modifications and variants of the device for installing pipes of process plants in the food and beverage industry can be realized without departing from the spirit and the novel concept of the present invention. It is to be understood that no limitation is intended to the specific embodiments which were illustrated here. The disclosure should comprise all such variations that lie within the scope of protection claimed by the claims.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

REFERENCE LIST 1 device
2 first pipe system
2.1, 2.2, . . . , 2.n first pipeline group
2.i one of the pipelines from the first group
2.1 first pipeline from the first group
2.2 second pipeline from the first group
3 second pipe system (e.g., emptying)
3.1, 3.2, . . . , 3.n second pipeline group
3.i one of the pipelines from the second group
3.1 first pipeline from the second group
3.2 second pipeline from the second group
3.2* piggable second pipeline from the second group
(4) third pipe system (e.g. cleaning)
5 structure section
6 annular housing
6a connector opening
6b first seat
6c second seat
6d cylindrical recess
6e seat side stop surface
7 first valve housing
7a pipe connection
7b first clamping flange
7* second valve housing
7a* modified pipe connection
7b* second clamping flange
8 leakage and drainage housing
8a drain connection
8b third clamping flange
9 lantern housing
9a locking plate
9b fourth clamping flange
10 first closing member (valve piston)
10a first valve rod
10b (annular) first stop
11 second closing member (seat plate)
11a second valve rod (hollow rod)

11b cylindrical recess bore
11c inner lateral surface
11d (annular) second stop
11e outer lateral surface
11f traverse
11g closing member side stop surface (radially inside)
12 first seat seal
13 second seat seal
14 leakage cavity
15 cleaning nozzle
15a nozzle insert
15b locking ring
16 cover part
17 first ring
18 second ring
20 first rod seal
21 housing seal
22 drainage ring
22a drainage bore
23 second rod seal
24 third rod seal
25 guide ring
26 annular gap
27 cleaning agent connection
28 flushing connection
29 clamping ring
B1 to Bn valve distributor tree
Bi one of the valve distributor trees B1 to Bn
B1a to Bna hollow structure
Bia the pipeline Ri assigned to the hollow structure B1a to Bna
Bia.1 to Bia.m housing parts 1 to m of the hollow structure Bia
D1 first throttle gap
D2 second throttle gap
H opening lift
H1 first partial lift
H2 second partial lift
L longitudinal axis of the hollow structure/valve distributor tree
P process assembly (general)
P1 first process assembly
P2 second process assembly
P3 third process assembly
Pi $i^{th}$ process assembly
Pn $n^{th}$ process assembly
R pipe connections (general); that are led to the upper end of the respective valve distributor tree B1 to Bn
R1 first pipe connection
R2 second pipe connection
R3 third pipe connection
Ri pipe connection assigned to valve distributor tree Bi
Rn $n^{th}$ pipe connection
T tank (general)
T1 first Tank
T2 second tank
T3 third tank
Ti $i^{th}$ tank
Tn $n^{th}$ tank
T1a to Tna lower tank bottom of the respective tanks Ti to Tn
Tia $i^{th}$ tank bottom
$V_R$ double seat valve

The invention claimed is:
1. Piping system for process plants of the food and beverage industry that connects at least one of a tank and a process assembly to a pipe system via double seat valves formed mix-proof in the seat, the pipe system having at least one pipeline with at least one valve distributor tree, each valve distributor tree having an elongated hollow structure and at least one connector opening for connecting an interior of the valve distributor tree to the pipeline, wherein at least a first group of pipelines and if necessary, additionally a second group of pipelines are led on opposite sides of the elongated hollow structure towards an associated connector opening and past the elongated hollow structure;
wherein each valve distributor tree opens directly into a lower tank bottom of a respective tank, and/or wherein each valve distributor tree is connected via a pipe connection to an associated process assembly or tank and an end section of the pipe connection is connected to the valve distributor tree, perpendicularly or horizontal or however, inclined; and
wherein at least one double seat valve is disposed in a connection between the pipeline and the associated connector opening and this connection switches in the immediate vicinity to the hollow structure;
characterized in that the double seat valve has an open position and a closed position, wherein in the closed position, the double seat valve prevents overflow of fluids from the hollow structure into a valve housing wherein in each case one of the pipelines is connected to the valve housing,
the double seat valve having two serially disposed closing members, the closing members each having a closed position and an open position, wherein in both the closed position and in the open position, the closing members delimit a leakage cavity that has at least one connection path to the surroundings of the double seat valve,
wherein the first closing member is independently driven and in the course of its opening movement comes into sealing contact at the second closing member designed as a seat plate and transfers the second closing member into the open position;
wherein the second closing member has a hollow rod on its end facing toward the first closing member; and a second seat seal that acts together with a second seat that abuts a cylindrical first seat;
wherein the first closing member has a radially acting first seat seal that in the closed position of the valve is sealingly received in the first seat, which forms the connector opening;
wherein the hollow rod of the second closing member receives the second seat seal and has a cylindrical receiving bore that is formed with the same diameter as the cylindrical first seat,
wherein in the closed position of the second closing member, the cylindrical receiving bore merges with the cylindrical first seat in a flush manner;
wherein the second closing member has a closing member-side stop surface with a metallic stop at the second seat and a seat-side stop surface that borders directly at the first seat,
wherein valve rods are disposed concentrically within each other that are provided for the closing members which are led on one side through and out of the valve housing.
2. The piping system according to claim 1, characterized in that the valve distributor tree has a progression from below upwards, and that the first and second group of pipelines are disposed in each case in an arrangement forming rows below one another, in planes parallel to each other and to the longitudinal axis of the hollow structure.

3. The piping system according to claim 2 wherein that the valve distributor tree progresses upward perpendicularly.

4. The piping system according to claim 1, characterized in that the valve distribution tree runs crosswise, and that the first and the second group of pipelines are each disposed next to each other in planes parallel to each other, and on the one side or on opposite sides of the hollow structure, and are led past it in the planes crossing its longitudinal axis.

5. The piping system according to claim 4 wherein that the valve distributor tree runs horizontally crosswise.

6. The piping system according to claim 1, characterized in that the double seat valve is subjected to a seat cleaning by a respective partial lift of its closing members.

7. The piping system according to claim 6, characterized in that the seat cleaning of the first closing member occurs through a first partial lift in a direction opposite to the opening movement having an opening lift, and that of the second closing member through a second partial lift in the same direction, and that in the respective seat cleaning position, a leakage-side first throttle gap is provided at the first closing member and a second throttle gap is provided at the second closing member on the side facing away from the leakage cavity.

8. The piping system according to claim 1, characterized in that the hollow structure is designed in the area surrounding its connector opening as an annular housing that receives the seats and serves the connection of the valve housing.

9. The piping system according to claim 1, characterized in that the second closing member, designed as a hollow rod, has an outer peripheral surface that is cylindrical.

10. The piping system according to claim 9, characterized in that the second closing member opens into a leakage and drainage housing that connects to the valve housing at the side of the valve housing facing away from the annular housing, and is led there and sealed.

11. The piping system according to claim 10, characterized in that the second closing member in the area of the interior of the leakage and drainage housing merges into the smaller diameter second valve rod, and a fluid-passable connection is provided between the interior of the second closing member and the interior of the second valve rod, via at least one traverse oriented substantially radially.

12. The piping system according to claim 10, characterized in that the valve rods at the side of the leakage and drainage housing facing the valve housing are led through and out of the leakage and drainage housing.

13. The piping system according to claim 10, characterized in that the leakage cavity is connected, via a drainage bore delimited by an inner peripheral surface of the second closing member, to the interior of the leakage drainage housing, that opens into a drainage connection.

14. The piping system according to claim 1, characterized in that a pipe connection at the valve housing, relative to the arrangement position of the valve housing opens tangentially with its lower inner peripheral line at the lowest point of the interior of the valve housing.

15. The piping system according to claim 1, characterized in that, relative to the arrangement position, the longitudinal axis of the valve housing is horizontal or, viewed from the connector opening, progresses declining at an angle to horizontal, and that an inner peripheral wall of the leakage cavity has a slope on the side of the gravitational force towards its outlet opening.

16. The piping system according to claim 1, characterized in that a cleaning agent connection is disposed in a lantern housing connecting to a leakage and drainage housing that is connected to an annular gap formed between the valve rods, wherein the annular gap at its end facing away from the cleaning agent connection opens into the leakage cavity via a cleaning nozzle.

17. The piping system according to claim 1, characterized in that an annular first stop is provided radially outwards at the valve rod that in the course of the opening movement of the double seat valve acts together with a corresponding annular second stop at the inner side of the second valve rod and here at the moment of the second closing member being carried along by the first closing member.

18. The piping system according to claim 1, characterized in that the pipeline is designed continuous, having an unobstructed passage cross-section having a circular shape, and is led past a respective valve housing of the double seat valve, and is connected in each case to the latter in a fluid-passable manner.

19. The piping system according to claim 1, characterized in that the hollow structure is a cylindrical pipe.

20. The piping system according to claim 1, characterized in that the lower end of the hollow structure facing away from the respective tank or the respective pipe connection, is connected to a third pipe system.

21. The piping system according to claim 1, characterized in that the pipelines are each designed as continuous pipelines assigned to all pipeline connections in the same function.

22. The piping system according to claim 1, characterized in that the valve distributor trees have an arrangement forming rows or a matrix.

23. The piping system according to claim 1, characterized in that the hollow structure is composed in each case of an aggregation of individual structure sections, which are connected together in the direction of the longitudinal axis of the hollow structure in a fluid-passable manner, and having at least one connector opening in each case.

24. The piping system according to claim 23, characterized in that the structure sections are formed in different sizes in the shape of housing parts.

25. The piping system according to claim 24, characterized in that the connector opening has a passage cross-section depending on the size of the respectively assigned housing part.

* * * * *